(No Model.) 9 Sheets—Sheet 1.

A. B. CARTY.
PRINTING PRESS.

No. 401,541. Patented Apr. 16, 1889.

Witnesses:
Thos. Houghton.
W. H. Craig

Inventor:
Alton B. Carty.
By his Atty.
W. H. Singleton.

(No Model.) 9 Sheets—Sheet 4.
A. B. CARTY.
PRINTING PRESS.

No. 401,541. Patented Apr. 16, 1889.

Witnesses:
Thos. Houghton.
W. H. Craig

Inventor:
Alton B. Carty.
By his Atty.
W. H. Singleton

N. PETERS, Photo-Lithographer, Washington, D. C.

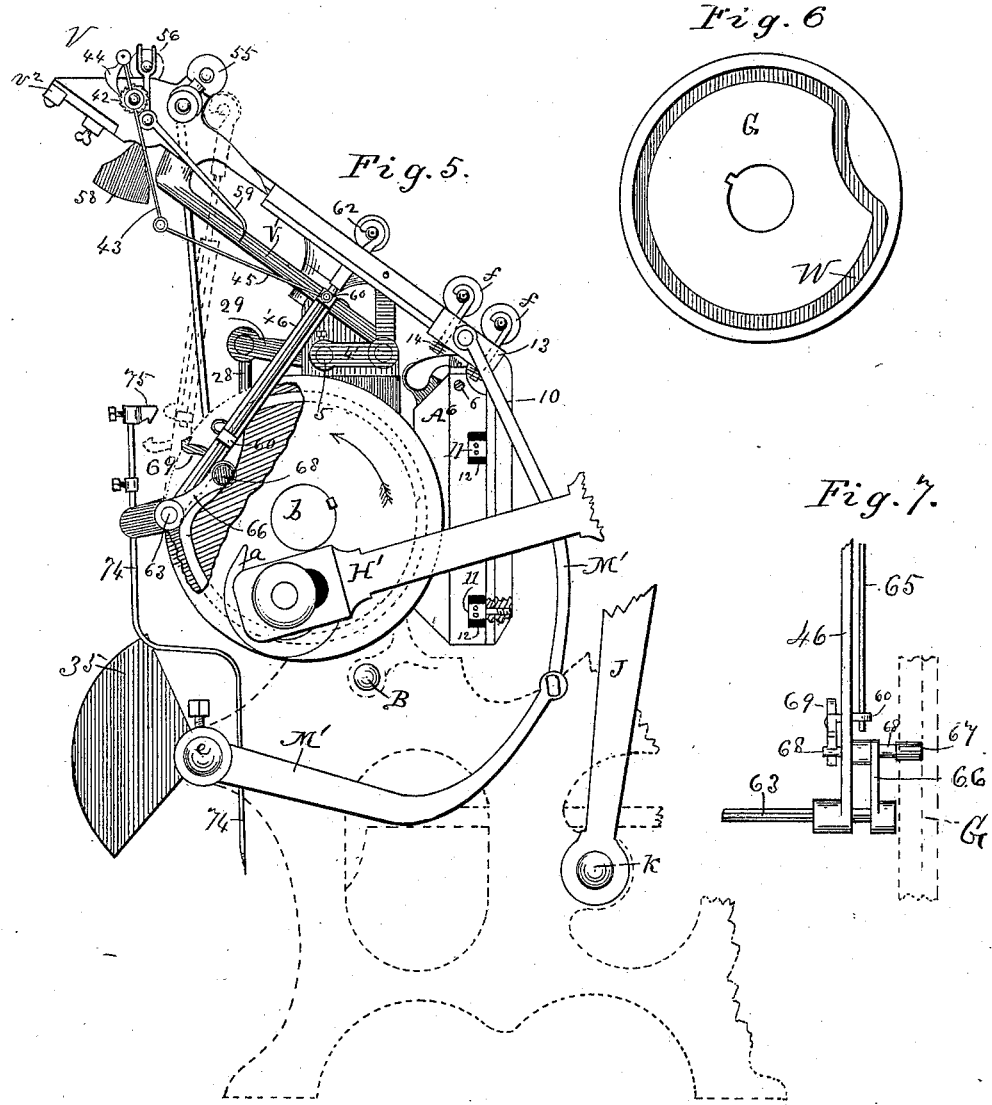

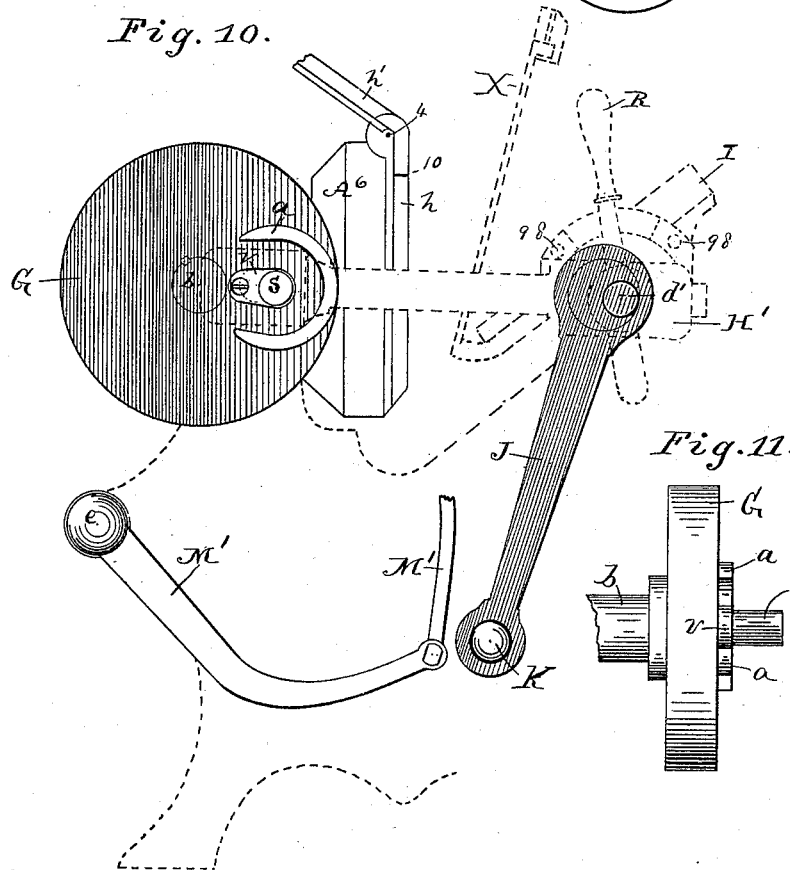

(No Model.)  9 Sheets—Sheet 7.
A. B. CARTY.
PRINTING PRESS.
No. 401,541. Patented Apr. 16, 1889.
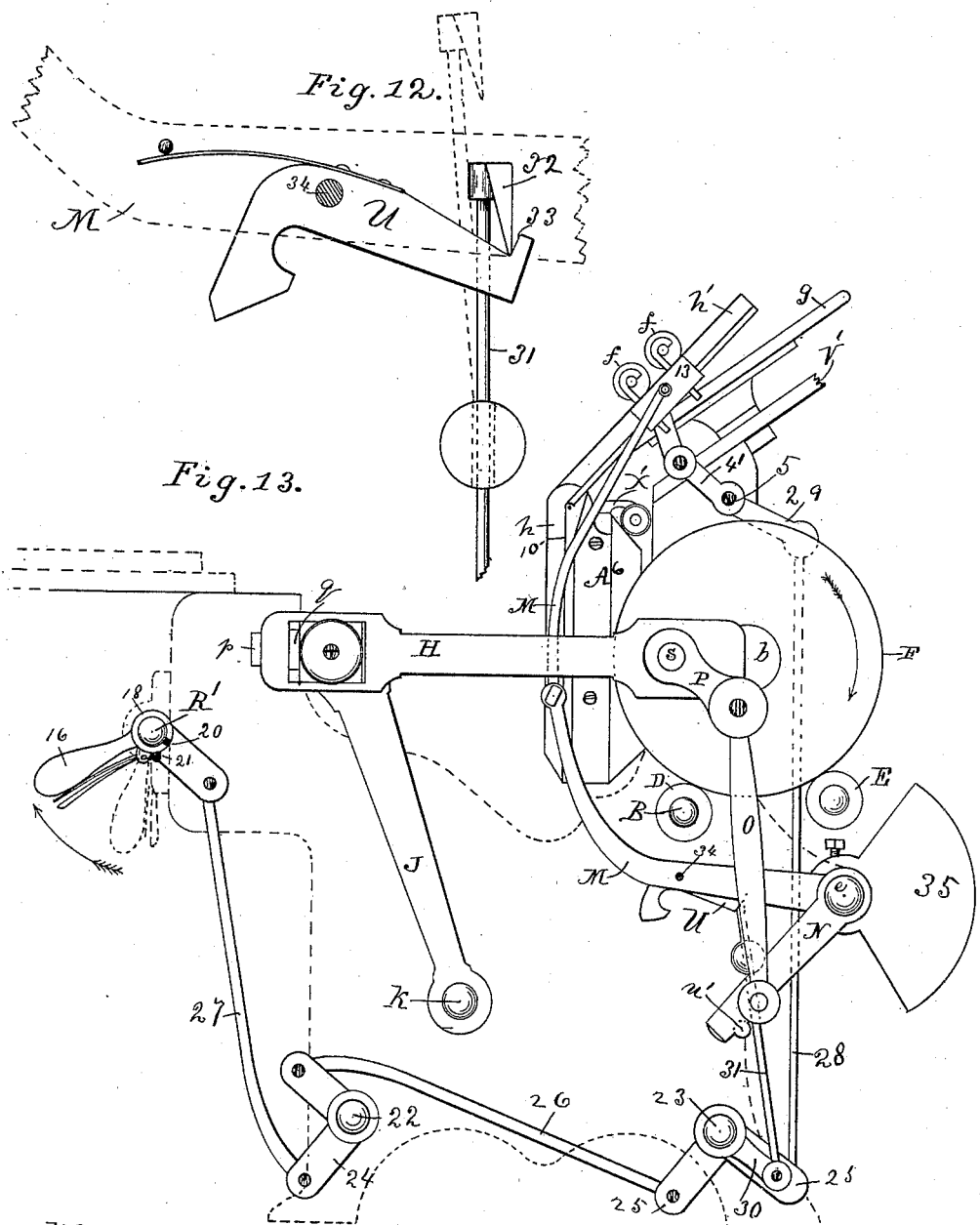

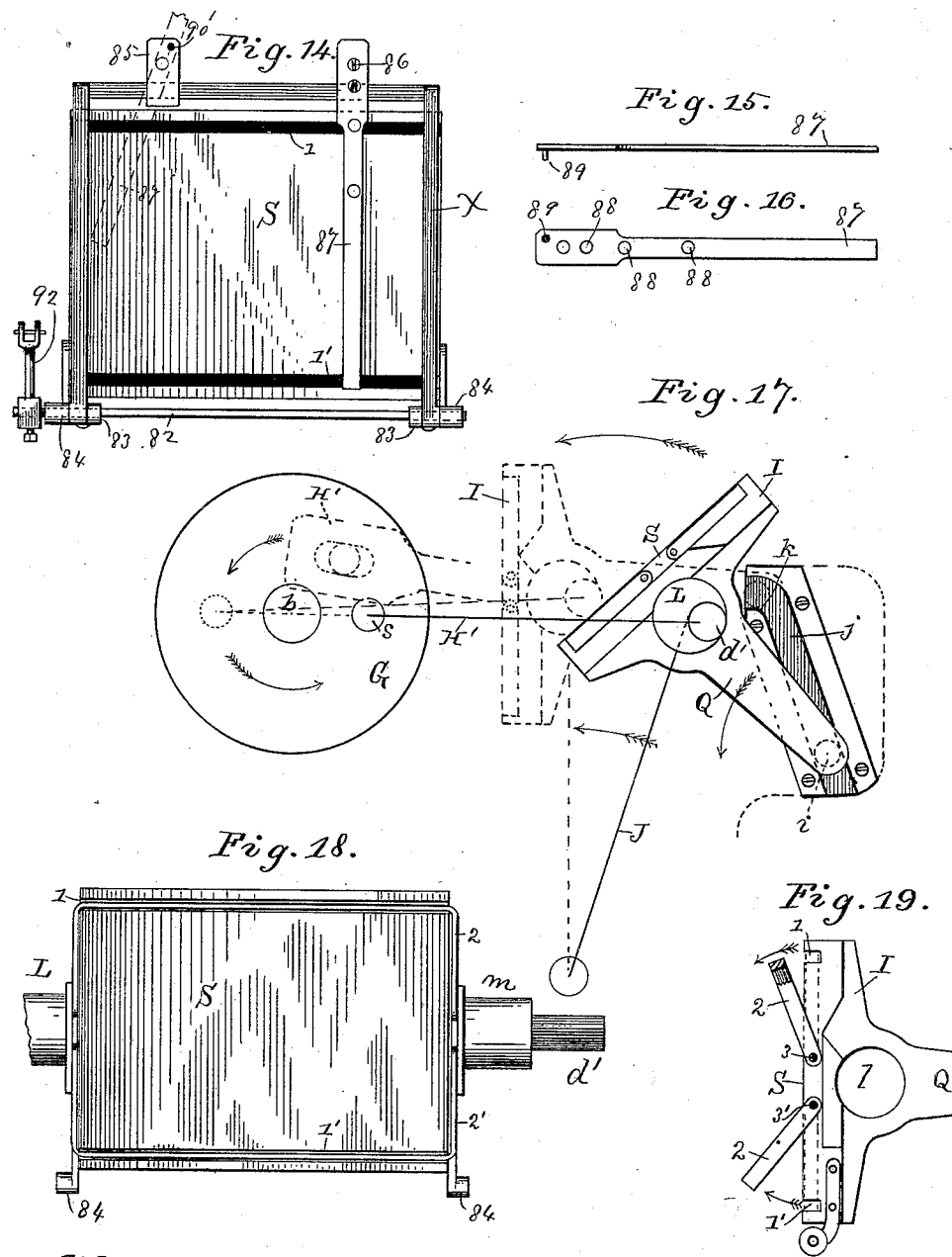

(No Model.) 9 Sheets—Sheet 9.
A. B. CARTY.
PRINTING PRESS.
No. 401,541. Patented Apr. 16, 1889.
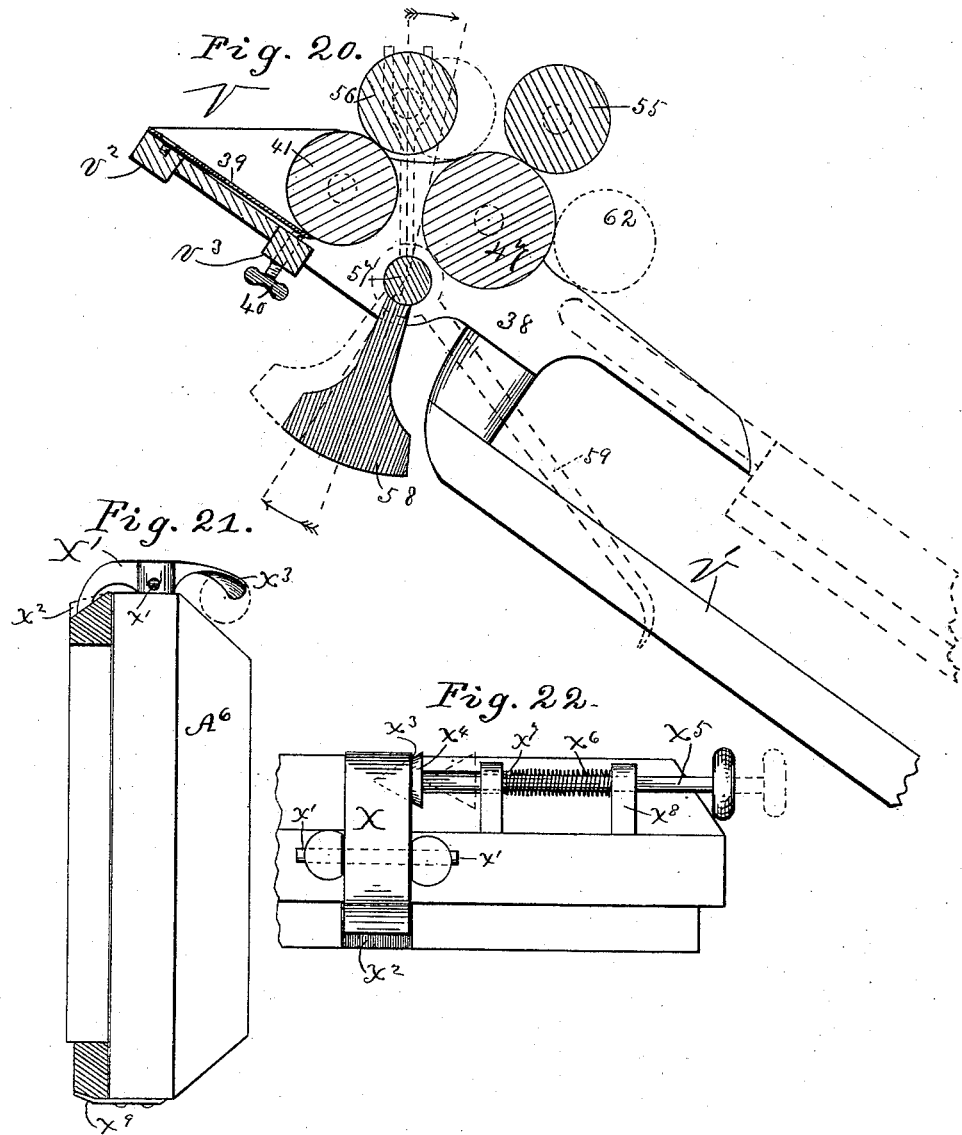
Witnesses:
Thos. Houghton
W. H. Craig
Inventor:
Alton B. Carty.
By his Atty. W. H. Singleton.

UNITED STATES PATENT OFFICE.

ALTON B. CARTY, OF FREDERICK, MARYLAND.

PRINTING-PRESS.

SPECIFICATION forming part of Letters Patent No. 401,541, dated April 16, 1889.

Application filed March 17, 1888. Serial No. 267,522. (No model.)

*To all whom it may concern:*

Be it known that I, ALTON B. CARTY, a citizen of the United States, residing at Frederick, in the county of Frederick and State of Maryland, have invented certain new and useful Improvements in Printing-Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
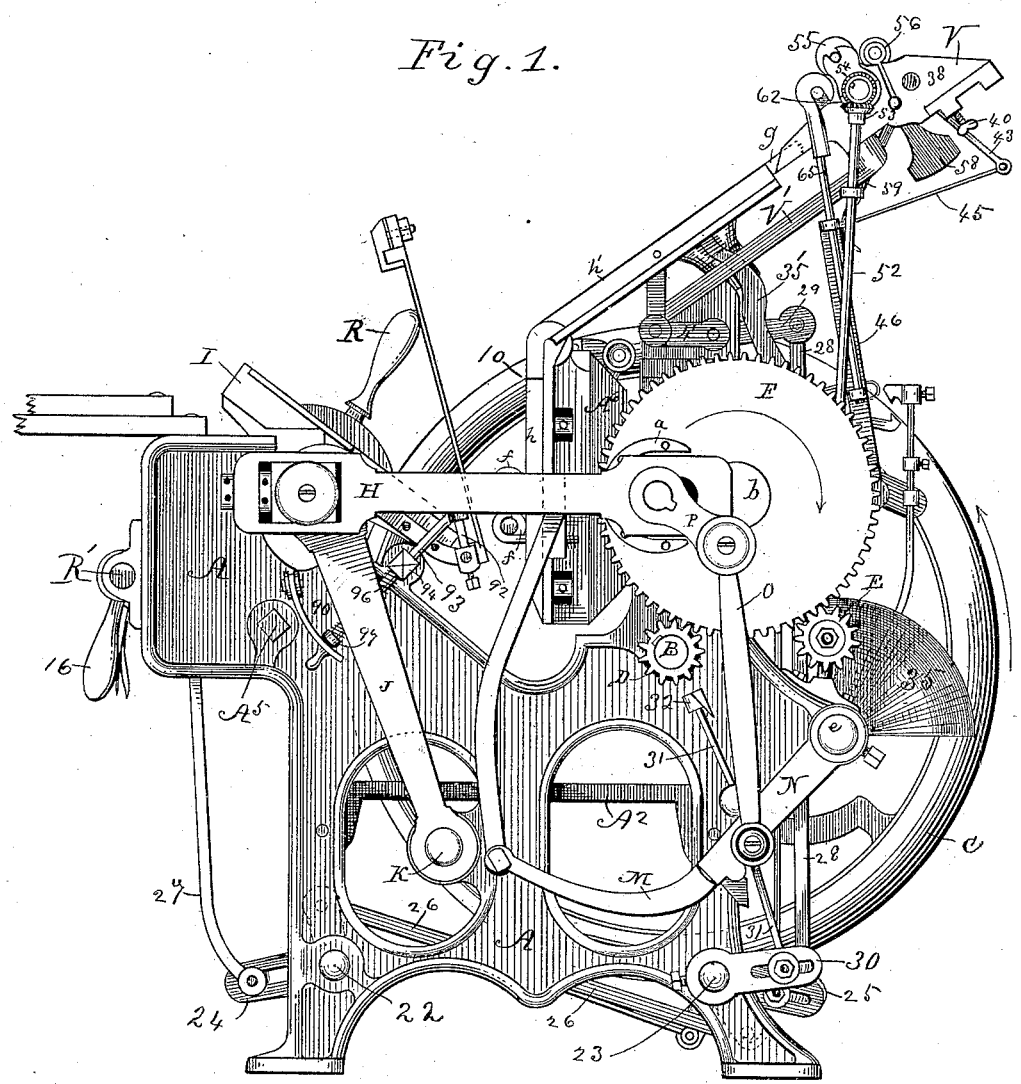
Figure 2:
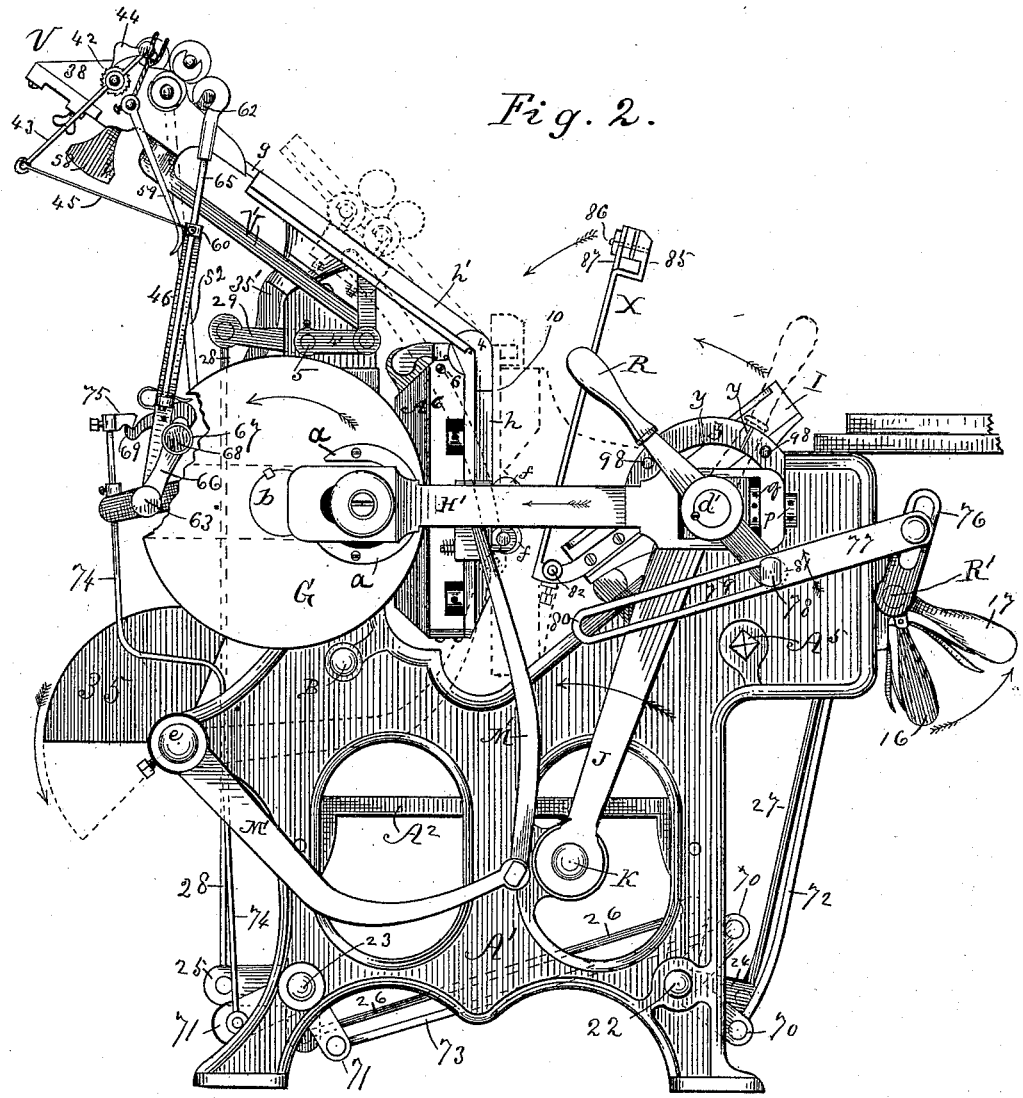
Figure 3:
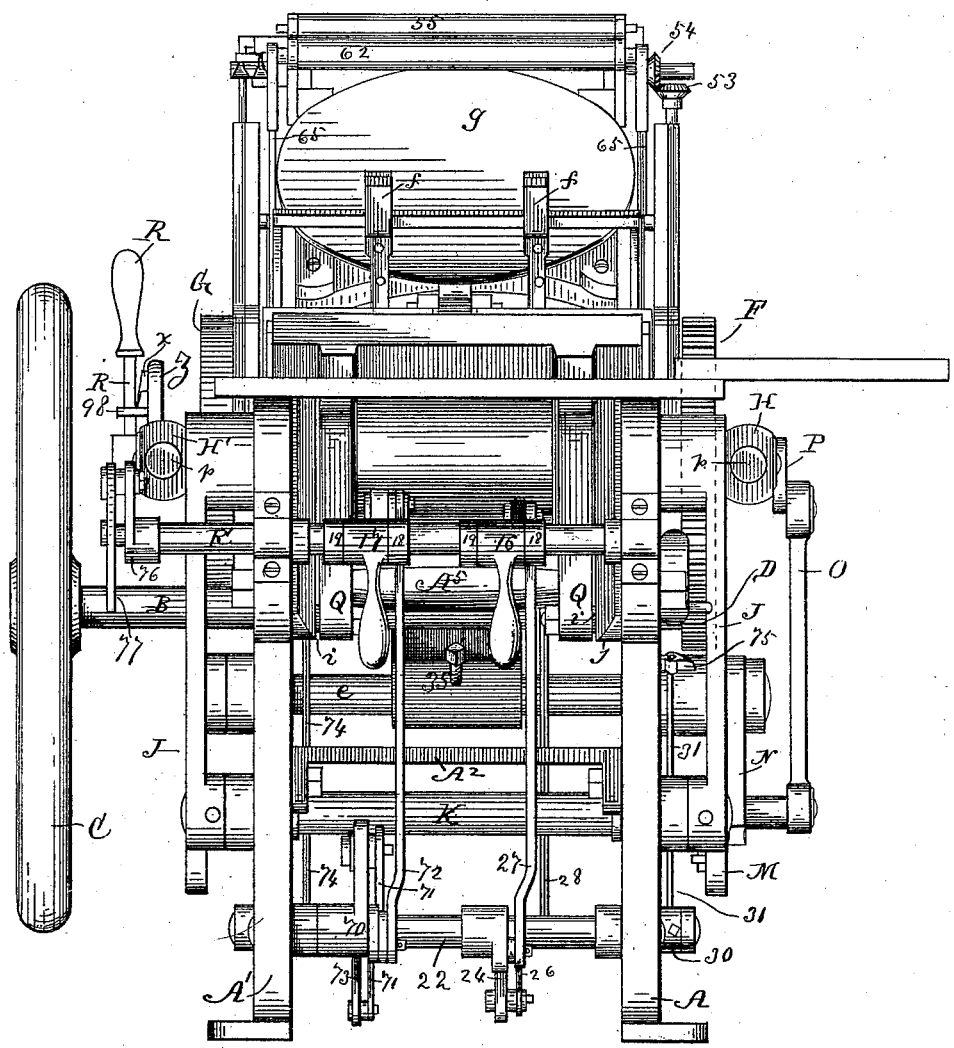
Figure 4:
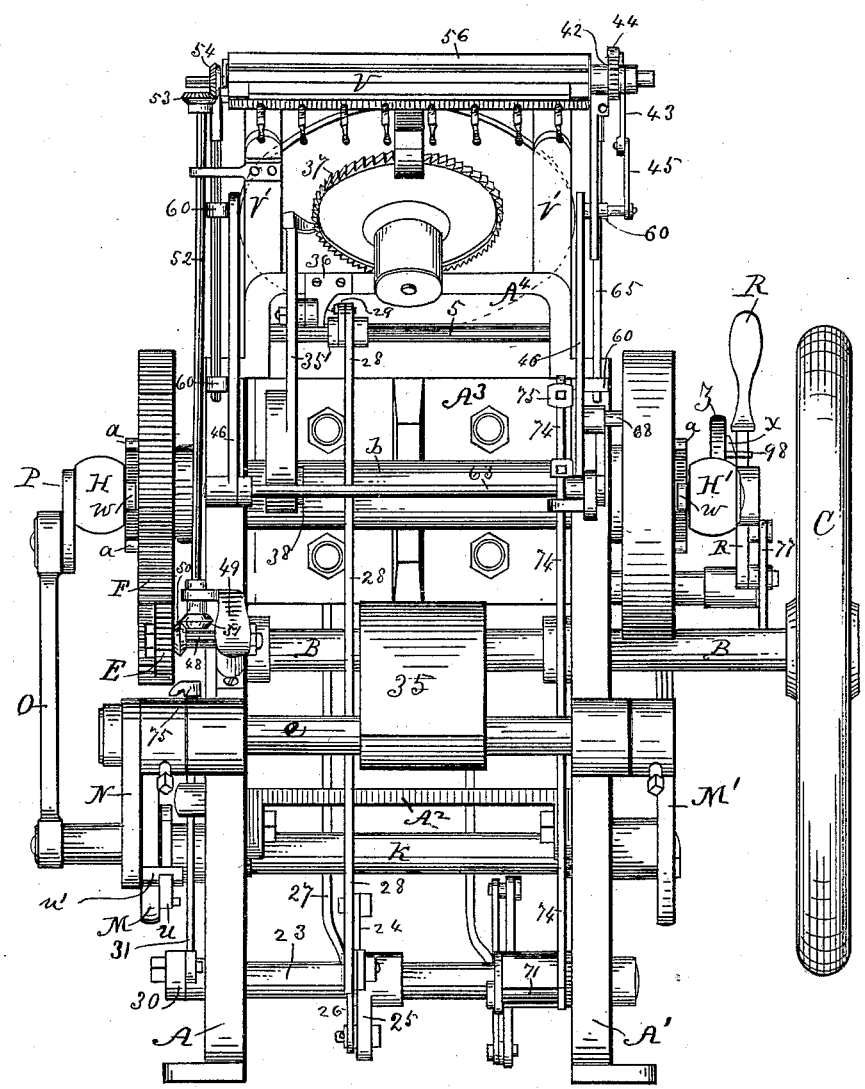

Figure 1 is a view of the right side of a printing-press embodying my invention. Fig. 2 is a view of the left side of the same without the fly-wheel. Fig. 3 is a front elevation. Fig. 4 is a rear elevation. Fig. 5 is a detail side view of the mechanism for operating the ink-fountain and plate-rollers. Figs. 6 and 7 are detail views of the same. Figs. 8 and 9 are top and inside views, respectively, of the platen connecting-rod of the left side of the press. Fig. 10 is a diagrammatic view of cam-wheel and rocking lever which supports and operates the platen. Fig. 11 is an edge elevation of cam-wheel for operating the platen and plate-roller. Fig. 12 is a detail view of locking mechanism for form-roller arms. Fig. 13 is a side elevation of mechanism for unlocking and lifting roller-ways. Figs. 14, 15, and 16 are detail views of the platen, frisket-frame, and fingers. Fig. 17 is a diagram illustrating motions of platen. Figs. 18 and 19 are details of platen and tympan-holder. Fig. 20 is a vertical section through ink-fountain. Fig. 21 is a side elevation of front end of type-bed plate with chase in section, showing locking device. Fig. 22 is a top view of the same.

This invention relates to that class of printing-machines termed "bed and platen presses," and has for its object the simplifying and perfecting of the various essential parts of such machines. I attain these objects by the mechanism illustrated in the accompanying drawings, and as hereinafter fully described, and pointed out in the claims.

Similar letters refer to similar parts throughout the several views.

A and A' are the sides or main portions of the frame; A², a horizontal quadrangular brace; A³, a vertical quadrangular brace; A⁴, a top brace, and A⁵ a front brace. A⁶ is the type-bed plate, which holds the chase in position.

B is the main shaft, which is driven by a belt and pulley in the usual manner.

C is a fly-wheel.

D is a pinion rigidly secured to one end of main shaft B and outside of the left side of the press.

E is a pinion for communicating a constant rotary motion to the ink-distributing roller, as will be hereinafter described.

F is a spur-wheel provided with a peculiar-shaped cam, $a$, on its outer face, and is mounted on a shaft, $b$, bearing on its other end, and outside of the frame, at the right side of the press, a cam-wheel, G, provided on its outer face with a cam, $a$, similar to the cam on wheel F.

H and H' are connecting-rods to operate the platen I, which is supported on oscillating arms J, rigidly secured to the ends of rock-shaft K, near the front end of the press.

L is the platen-shaft, provided at each end with eccentric bearings $d'$, on which are supported the front ends of connecting-rods or draw-bars H H'. M M' are curved jointed arms adjustably secured on shaft $e$, their office being to carry the form-rollers $f f$ from the revolving distributing-disk $g$ over the ways $h$ $h'$ to the form in the usual well-known manner. By having arms $m'$ $m'$ adjustably secured to shaft $e$ said arms may be quickly and easily removed from shaft $e$ whenever desired or brought into exact alignment with each other, so as to secure the parallelism of the form-rollers in their passage over the form.

N is an auxiliary arm swinging loosely on shaft $e$, and automatically connected to curved arm M by a pin and spring-latch, as will be presently described.

O is a connecting-rod, and P a revolving arm, by which, in combination with auxiliary arm N and spring-actuated hook U, the form-rollers are moved or set at rest, as will be hereinafter more fully explained.

The above are the principal parts of my improved press. In the details of its construction I have adapted it to combine the best results of the two prevalent theories in regard to bed and platen printing—viz., the dwell upon the impression and the force and equality of the impression. To this end I construct the platen with two central and backwardly-extending arms, Q, each carrying near its end a small friction-roller, $i$, which runs in a cam-groove, $j$, on the inside of the front end of the machine. Said cam-groove $j$ is shaped as shown in Fig. 17. At its top end is a short horizontal bearing, $k$. From this point it inclines downward and outwardly at a slight inclination from the vertical, as shown in said figure. A shaft-hole, $l$, is made transversely through the platen a little below its face, as shown in Fig. 19. The platen-shaft L is of two diameters, its central portion, $m$, being larger than its ends $d\,d'$. The platen is free to partially rotate on its shaft. The two smaller portions $d'$ serve as pivotal points for the front ends of draw-bars H H', before referred to. By referring to Fig. 17 it will be seen that by this construction of the platen and its cam-guide grooves $j$ it will assume the two positions shown in that figure. In full line the platen is shown at rest during the feeding, and in dotted line its position when receiving impression. The direction of motion of platen I, cam-wheel G, draw-bar H', and oscillating arm J are indicated by arrows and dotted lines in said figure. Draw-bars H H' are slotted at their forward ends to receive journal-boxes $o$, fitted to eccentric pinions $d'$ of platen-shaft.

$p$ and $q$ are adjusting-screws and binding-nuts, respectively, by which the journal-boxes may be adjusted in or outwardly in their slots or ways. The opposite ends of said draw-bars are also slotted, as seen particularly in Fig. 9. Slots $r$ have semicircular ends and parallel sides. The extreme length of slots $r$ are such that when the platen is in the position shown in Figs. 1, 2, 10, and 17 the pins $s$ of cam-wheels F and G will be at their inner ends, $t$, as shown in Figs. 9 and 10. When the platen is receiving impression, pins $s$ will be at their opposite ends $u$, so that when receiving impression the full strain comes upon pins $s$, pivots $d'$, and draw-bars H H'. Pins $s$ are in the center of the semicircular ring-shaped cams $a$, which project about three-eighths of an inch from each of their faces of wheels G and F. In the center of cam $a$ is also a hub, $v$, equal in height to curve $a$, having rounded ends and flat sides slightly converging, as shown clearly in Figs. 10 and 11. Pin $s$ is secured to and projects from the larger end of hub $v$.

On the inner sides of bars H H', near slots $r$, are friction-rollers $w$, which run in the nearly circular space between curved guides $a$ and hubs $v$.

It is evident from the above that the platen will have a long dwell at its feeding position and a short dwell at impression.

To increase the power of the impression and for other purposes, to be hereinafter described, I secure a shifting-lever, R, to pivotal end $d'$ of platen-shaft, on the right side of the press, as shown in Figs. 1, 2, 3, 4, and 10. Said lever R carries a spring-catch, $x$, which engages in serrations or notches $y$ in arc $z$, as clearly shown in Figs. 2, 3, and 4. When lever R is in the position shown in Figs. 1 and 2, it is in its normal position for general work. Should a little heavier impression be required, it is given by means of set-screws $p$. By pressing lever R to the position shown in Fig. 10 the impression is taken off entirely. The face of the platen is by means of lever R thus thrown toward or from the form by reason of the eccentricity of trunnions or pivots $d'$ on the platen-shaft. S is the face of the platen, in which, near the top and bottom, I cut grooves 1 1', to receive the platen-bands 2 2', which are pivotally connected to the outside of the right and left sides of the platen, as shown at 3 3' in Fig. 19. By this arrangement tympan can be more readily and evenly secured than by the ordinary construction of tympan-holders.

$h\,h'$ are the roller-ways, constructed of two separate parts pivotally connected together at 4, forming a hinge-joint. The upper oblique part, $h'$, is held in its normal position, parallel to and in the same plane as the face of the usual rotating ink-disk $g$, by jointed arms 4', mounted one at each end of shaft 5, near the top of the frame, and whose upper ends are pivoted to ways $h$, as shown in Figs. 1, 2, 4, and 5. The lower and vertical ways $h$ are secured by screws 6 to the bed-plate. The front portions of vertical ways $h$ are divided into two portions and tongued and grooved at a point, 10, just above the form, and below this point they are horizontally adjustable by set-screws 11, whose heads are held in position by slots 12, as shown in Fig. 5. By this arrangement I regulate the pressure of the rollers against the form.

The form-rollers are mounted in the usual manner in two sliding boxes, 13, the rollers being kept in contact with the ways by springs 14, as is usual in such cases. Motion is imparted to the form-rollers by gear-wheel F by means of crank-arm P on the outer end of wrist-pin $s$ and connecting-rod O, as herein shown.

As auxiliary arm N is not keyed to or otherwise secured to shaft $e$, it cannot alone impart motion to any other part of the press. It is therefore coupled and uncoupled to arm M by a spring-hook, $u$, and pin $u'$, as particularly shown in Figs. 12 and 13. At the front upper part of the press is a transverse shaft, R', bearing two handled levers, 16 17, which are free to turn on said shaft, and are held laterally in place between two collars, 18 19, one of which has a slot, 20, in its face adapted to receive a spring-pawl, 21. Two transverse shafts, 22 23, one at each end of the machine and near the bottom thereof, have each a bell-crank lever, 24 25, rigidly secured to them, and are connected to each other by a rod, 26. Another rod, 27, connects lever 24 with lever 16, and a vertical rod, 28, in the rear of the press connects lever 25 with an arm, 29, secured to shaft 5, which operates the jointed arms 4' at the top of the machine. On the outside of shaft 23 is rigidly secured an arm, 30, to which is pivoted a rod, 31, which carries at its upper end a detent, 32, adapted to engage into a recess, 33, in the tail of spring-latch U, which is pivoted at 34 to the inside of curved arm M, as shown in Figs. 1, 4, 12, and 13.

It will be understood from the above arrangement of parts that when the handle of lever 16 is pulled out of engagement with slot 20 rod 28, by pulling down arm 29 of shaft 5, will raise the upper roller-ways to the position shown in Fig. 13 and in dotted lines in Fig. 2, and at the same time detent-rod 31 is depressed, causing its detent 32 to come in contact with spring-latch U and disengages it from pin $w'$ of auxiliary arm N, so that when arms M M' have been carried up to the position shown in Fig. 13 said arms and form-rollers and ways will be held by counterbalance-weight 35 in the position shown in Fig. 13.

The ink-distributing disk $g$ is rotated by a weighted lever, 35', pivoted to a bracket, 36, and which carries at its upper end a spring-pawl to engage in ratchet-teeth 37 in the usual manner. Lever 35' is operated by a single toothed cam, 38, projecting from shaft $b$.

The ink-fountain V (shown in section in Fig. 20) consists of two end plates, 38, secured to the upper ends of arms V', which project from the top brace, $A^4$, of the press. Said end plates, 38, are connected to each other by two bars, $v^2 v^3$, to the former of which is secured the upper edge of flexible bottom plate, 39, which is made adjustable at its lower edge by set-screws 40 in the usual manner. Near the lower edge of plate 39 is the fountain-roller 41, which carries on its outer right-hand end a ratchet-wheel, 42. Outside of said ratchet-wheel is a lever, 43, pivoted by a collar or hub to shaft of fountain-roller, and which carries at its upper short arm a weighted pawl, 44, which engages with ratchet-wheel 42. It will be seen on reference to Figs. 2 and 5 that pawl 44 is kept in working contact with ratchet-wheel 42 by gravity alone, and that when it is desired to stop temporarily the supply of ink from the fountain it will be necessary only to reverse the position of said pawl by turning it over backward out of engagement with the ratchet-wheel 42. The long arm of said lever 43 is connected by a rod, 45, to an oscillating carrying-arm, 46.

47 is the distributer, which receives a constant rotary motion by the following mechanism: The pinion E is mounted on the end of a stud, 48, supported by a bracket, 49. Said pinion meshes into and receives motion from spur-wheel F. At the back of pinion E and integral with it is a bevel-pinion, 50, which drives bevel-pinion 51, secured to the lower end of shaft 52. At its upper end shaft 52 carries a bevel-pinion, 53, which gears into bevel-pinion 54, which is secured to shaft of the distributing-roller by a spline or equivalent means, so as to permit said distributer to have a longitudinal reciprocating motion in the usual and well-known manner.

55 is the rider which causes the ink to be evenly spread upon the distributer.

56 is the intermediate or carrying roller, whose office is to receive the ink from the fountain-roller and carry it to the distributing-roller. This is done in the following manner: The intermediate roller is supported upon bifurcated standards, which are secured to the rock-shaft 57, which is provided with a balance-weight, 58, about midway of its length. An arm, 59, is secured at one end of said shaft 57. The lower end of arm 59 is slightly curved, so as to adapt it to bear easily against a projection, 60, of the carrying-arm 46 of plate-roller 62.

Two vertical arms, 46, are rigidly secured to a rock-shaft, 63, in the back part of the frame. On each arm are perforated lugs 60, which carry hooked rods 65, at the upper end of which is the plate or disk roller 62. At the end of rock-shaft 63 is loosely secured a crank-arm, 66, which carries a roller, 67, at its outer end, which engages in a cam-groove, W, on the inner face of wheel G. The same stud, 68, on which roller 67 is borne, is continued through crank-arm 66, and beyond the same to a sufficient distance to be engaged by a spring-hook, 69, which is pivoted to the inside of arm 46, as shown in Figs. 1, 2, 5, and 7. In the normal working of the fountain, arms 46 and crank-arm 66 are coupled and move together by spring-hook 69 engaging with pin 68, as above described. Plate-roller 62 receives its ink from the distributing-roller by running up a short incline of the fountain-frame ends, as shown in Figs. 1, 2, 5, and 20.

As it is desirable sometimes to stop the distribution of ink upon the plate, I accomplish this result by the following mechanism: On shaft R' is a handled lever, 17, the same in all respects as lever 16, hereinbefore described. It also is free to turn upon said shaft R', except as engaged with it by a spring-catch. On shafts 22 and 23, in line with lever 17, are bell-crank levers 70 71. Said three levers are connected together by rods 72 73. From the last-named lever, 71, a rod, 74, runs upward to a point opposite to spring-hook 69. Said rod carries on its upper end a detent, 75, adapted to engage into the upwardly-turned end of hook 69, as seen in Figs. 1, 2, 3, and 4.

It is obvious that when handled lever 17 is raised to the position shown in Fig. 2 detent 75 will engage with spring-hook 69 and pull it down, so as to disengage it from pin 68, before referred to. In this case crank-arm 66 will be moved back and forth by its roller 67 running in cam-groove W, as before; but it cannot carry the plate-roller with it. It will remain in the position shown in Fig. 2. The fountain and the intermediate rollers will also be stopped. Thus the ink-supply will be entirely cut off.

To throw off the impression, to stop the supply of ink, and to raise and stop the form-rollers above the plate out of the way simultaneously and by one simple movement, I provide the following additional mechanism: At the right side of the press I secure an arm, 76, rigidly to the extended end of shaft R', to which is pivotally attached one end of a flat bar, 77, slotted at its other end to receive a sliding pin, 78, projecting from the lower end of impression-lever R, as shown in Figs. 2 and 3. Slot 79 of bar 77 is of such a length that when the platen-lever R is shifted to its dotted position shown in Fig. 2 its pin 78 will strike against the end 80 of slot 79, which will cause shaft R' to partially rotate and carry with it the system of levers before described, which are thus simultaneously caused to perform their otherwise separate functions, as hereinbefore described.

By throwing lever R to the position shown in full line in Fig. 2 its pin 78 will strike against the inner end, 81, of slot 79 and restore to motion the ink-fountain and other rollers, so as to perform their various functions, as above described. If lever R be shifted to the position shown by dotted lines in Fig. 10, the impression will be off while the press is working.

To facilitate the holding of a sheet for jobs having narrow margins, or for cards or other work, I construct the frisket as shown in Figs. 14, 15, and 16.

X is the frisket-frame, which is supported at the bottom of the platen upon a rod, 82, running through hubs 83 at the bottom of the frame and through bearings 84, which are secured to each side of the platen, as shown in the various figures, and more particularly in Figs. 14 and 18. The fingers slide upon the top bar of the frame and consist of two distinct parts.

85 is the base-plate, which is slotted, so as to allow it to be compressed by screws 86, so as to grip tightly the top bar.

87 87 are the fingers. They are constructed of a thin bar of steel having a series of holes, 88, near their top ends, and pins 89, projecting from their under side, which register with holes 90' in base-plate to keep the fingers from shifting laterally. These fingers may be placed obliquely in any required position to suit the job, as shown in dotted lines in Fig. 14. To allow the fingers to be adjusted, a curved pivoted arm, 90, is secured to one side of the machine, which, when pulled outwardly, allows the frisket-fingers to lie flat upon the platen. These fingers are operated automatically by the following mechanism: A short arm, 92, is secured to one end of rod 82. The upper end of arm 92 is pivotally connected to a rod, 93, which passes through a swiveled bearing-block, 94, secured to the frame. Rod 93 at its lower end has a spiral spring, which abuts against a head, 97, on said end of the rod and the block 94.

The lower headed end, 97, of frisket-operating rod 93 is supported upon a tripper, 90, which is a curved rod pivotally secured at its upper end to the side of the frame, as shown in Fig. 1. The use of tripper 90 is to permit the adjustment of the frisket-fingers upon the platen when a job is being arranged in the press. When tripper 90 is turned or tripped outward from under the end of the spring-supported rod 93, the frisket will lie upon the platen, having no power to rise, while the tripper is removed from under rod 93. As the platen moves toward the form, it comes into contact with the frisket, and as the latter is carried forward it moves the rod 93 through the block, compressing the spring and carrying the end of the rod away from the tripper. When the platen returns, the spring returns the grippers and the rod until arrested by the latter striking the tripper.

In Figs. 21 and 22 I show my improved spring-holder for the chase. X' is a tumbler-latch, pivoted at $x'$ to the top of type-bed $A^6$. Its forward end is curved downward, so as to drop into a recess, $x^2$, in upper part of chase. The rear end of tumbler-latch is hollowed out conically, as at $x^3$, to receive the cone-shaped point $x^4$ of bolt $x^5$. $x^6$ is a spiral spring abutting against shoulder $x^7$ and support or lug $x^8$. It will be seen that when bolt $x^5$ is pulled out, as shown in dotted lines in Fig. 22, the tumbler-catch X may be tilted downward, so as to release the chase. The chase is supported at the bottom upon lugs $x^9$.

What I claim as new, and desire to secure by Letters Patent, is—

1. In a printing-press, the combination, with the platen, of a frisket-frame pivoted at its lower edge to the platen and provided with an arm at one side, and a spring-operated rod and a tripper, all arranged so that when the platen returns the spring returns the grippers and the rod until arrested by the latter striking the tripper, as herein set forth.

2. In printing-presses, the roller-ways consisting of a vertical or form portion adjustable to or from the form by set-screws, and an inclined or plate portion hinged to the vertical or lower portion and supported in position by hinged arms operated by levers, as herein set forth.

3. In printing-presses, the combination of an auxiliary arm loosely connected to the shaft of the form-roller-operating arms by a spring-latch, U, and stud or pin $u'$, and a rod, 31, provided with a detent, 32, by which said form-roller-operating arms may be disengaged from the auxiliary arm, as and for the purposes herein set forth.

4. In printing-presses, the plate-roller mechanism consisting of two vertical oscillating arms, 46, rigidly secured to shaft 63 and provided with guide-lugs 60 for rod of plate-roller, said shaft 63 carrying upon one end a loosely-connected arm, 66, adapted to engage with cam-wheel G, and a stud or pin, 68, in combination with spring-hook 69, pivoted to one arm, 46, as herein set forth.

5. In combination with the plate-roller mechanism above claimed, the detent 75, rod 74, bell-crank levers 70 and 71, connecting-rods 72 and 73, and handled lever 17, as herein set forth.

6. In a printing-press, the system of levers 16, 24, 25, and 29 and their connecting-rods 26, 27, and 28, and pivoted roller-ways adjacent to the ink-disk, whereby the roller-ways may be elevated above the ink-disk, as herein set forth.

7. In a printing-press, the combination of arm 30, shaft 23, rod 31, detent 32, and spring-hook U, pivotally connected to one of the form-roller-operating arms, and auxiliary arm N, loosely secured to shaft e, balance-weight 35, and the system of levers 16, 24, 25, and 29 and their connecting-rods 26, 27, and 28, whereby the roller-ways are elevated and the form-rollers carried up and rested therein, as herein set forth.

8. In a printing-press, two handled levers, 16 17, connected by spring-pawls to shaft R′, arm 76 of shaft R′, rigidly secured thereto, platen-lever R, secured to eccentric pin d′ of platen-shaft, and slotted bar 77, whereby the roller-ways may be elevated, the form-rollers rested thereon, the plate-roller rested above the ink-disk, and the impression taken off, all simultaneously and by one movement of lever R, as herein set forth.

In testimony whereof I affix my signature in presence of two witnesses.

ALTON B. CARTY.

Witnesses:
MARSHALL FOUT,
DAVID O. THOMAS.